April 8, 1969 E. MONTALVO ET AL 3,437,939

SYNCHRONIZATION SYSTEM

Filed Sept. 30, 1965 Sheet 1 of 2

INVENTORS
EMANUEL (NMI) MONTALVO
KENNETH G. KRANHOLD
WAYLAND A. CARLSON

ATTORNEYS

INVENTORS
EMANUEL (NMI) MONTALVO
KENNETH G. KRANHOLD
WAYLAND A. CARLSON
BY
ATTORNEYS

United States Patent Office 3,437,939

Patented Apr. 8, 1969

3,437,939

SYNCHRONIZATION SYSTEM

Emanuel Montalvo, Kenneth G. Kranhold, and Wayland A. Carlson, San Diego, Calif., assignors to the United States of America as represented by the Secretary of the Navy Filed Sept. 30, 1965, Ser. No. 491,844
Int. Cl. H03k 3/04, 1/00
U.S. Cl. 328—63 11 Claims The invention described herein may be manufactured and used by or for the Government of the United States of America for governmental purposes without the payment of any royalties thereon or therefor.

This invention relates to a system for generating substantially synchronous signals and more particularly to such a system which is capable of generating substantially synchronous signals within a determinable degree of lack of synchronism in accordance with the requirements of the purpose for which such substantially synchronous signals are to be used.

In the prior art, systems analogous to that of the present invention were frequently able to generate synchronous signals by reason of deriving two signals from the same source. However, in the development of advanced systems it became necessary in some instances to employ separably operable pieces of equipment which nonetheless must be capable of developing substantially synchronous signals over relatively long periods of time and with a high degree of frequency stability. In such systems those skilled in the art will appreciate that inasmuch as the sources of the substantially synchronous signals are separable, one cannot depend upon the same signal source to assure substantial synchronism of the two signals derived as required by the system. Therefore, it must be assumed that two different signal sources will be employed and further it must be assumed that the basic signal sources may be asynchronous. It is to this particular problem of deriving two substantially synchronous signals from two different asynchronous signal sources which are discrete and separate from each other that the present invention is directed.

In one form the present invention may comprise a system for generating substantially synchronous signals from discrete first and second asynchronous signal sources. A first frequency divider is connected appropriately to divide the frequency of the first asynchronous signal source to a first subfrequency. A second frequency divider is adapted to divide the second asynchronous frequency to a second subfrequency which is the same frequency as the first subfrequency. Included in the equipment is a coincidence gate which is operative to produce an output in response to some determinable minimum coincident duration of two input signals. The coincidence gate is connected to receive one input signal from the second asynchronous signal source and has its output connected to the second frequency divider described above. Appropriate means are connected between the first frequency divider output and the coincidence gate, and such means include an electrical delay connected in circuit with the first frequency divider signal. The electrical delay has a value which is such to cause coincidence of the first frequency divider signal with the second asynchronous signal for at least the determinable minimum duration to render the coincidence gate operative. Accordingly, the system of the present invention insures that the coincidence gate will be operative upon the proper count of signals from the second synchronous signal source so as to produce a subfrequency which is substantially synchronous with the subfrequency derived from the first asynchronous signal source.

It is a primary object of the present invention to provide a system for generating substantially synchronous signals from discrete first and second asynchronous signal sources.

A further object of the present invention is to provide such a system for generating substantially synchronous signals within a determinable degree of synchronism.

A further object of the present invention is to provide a system for generating substantially synchronous signals from first and second asynchronous signal sources in which the degree of lack of synchronism is inversely proporitonal to the ratio of the discrete asynchronous signal sources to substantially synchronous subfrequency signals derived therefrom.

A still further object of the present invention is to provide a system of the character described in which a variable delay is provided to assure the operation of a signal coincidence response means which controls the generation of one of the substantially synchronous signals with respect to the generation of the other of the substantially synchronous signals.

These and other objects, features and advantages of the present invention will be more fully understood from the explanation of a typical embodiment of the present invention as disclosed herein when taken with the illustrative drawings and its scope will be pointed out in the appended claims.

Figures 1, 2:
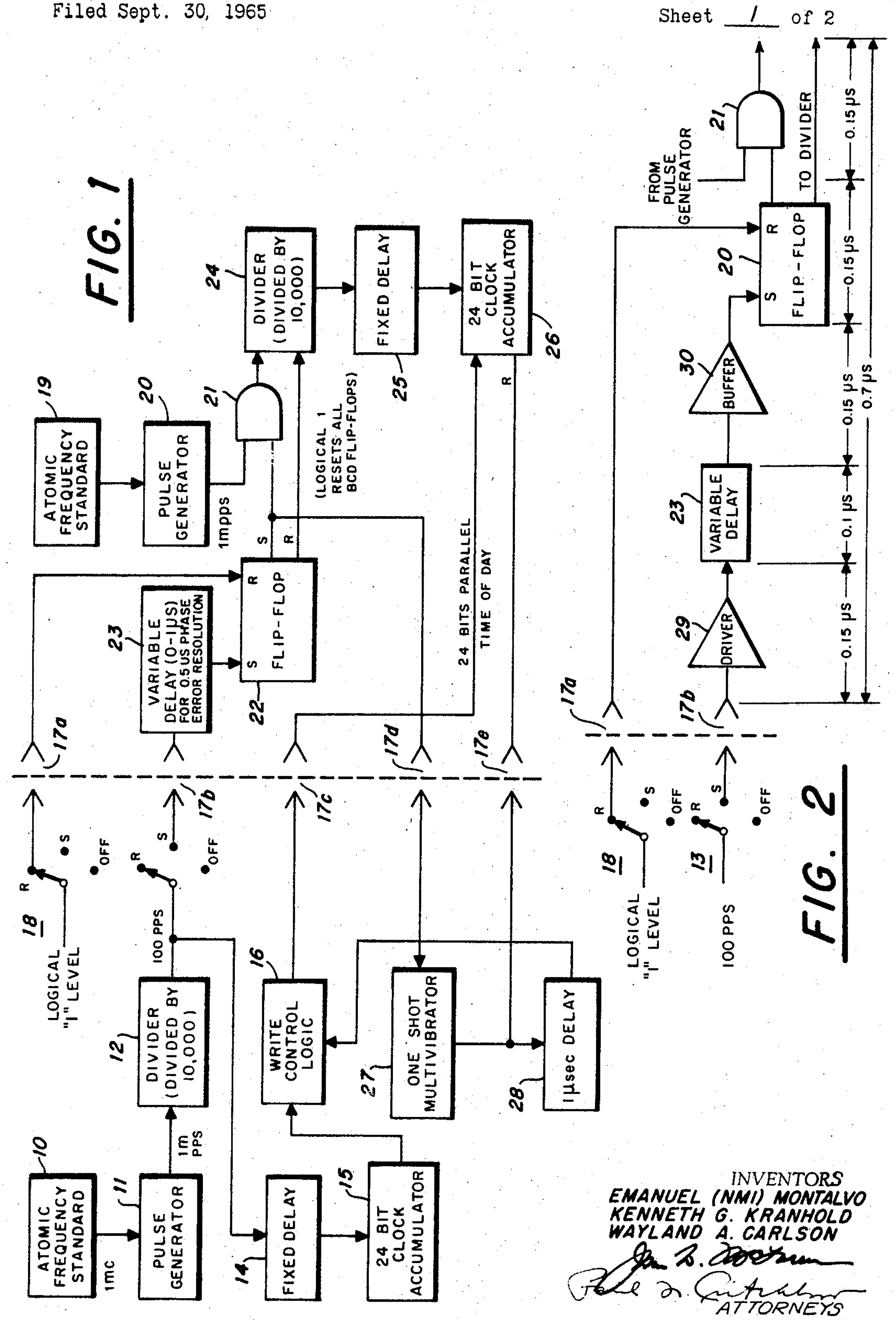
FIG. 1 is a schematic block diagram of a typical embodiment of the present invention.
FIG. 2 is a schematic block diagram of a portion of the system illustrated in FIG. 1.

As may be seen in FIG. 1, the embodiment illustrated is divided into two discrete portions, the left hand portion of the diagram being indicated to be the master portion and the right hand portion of the diagram being indicated to be the slave portion. The master portion of the embodiment of FIG. 1 is shown to comprise a source of signals in the form of an atomic frequency standard 10 which may, for instance, be 1 megacycle frequency. The output of the atomic frequency standard 10 is connected to a pulse generator 11 which develops an output in the form of substantially square-wave pulses, of one megacycle frequency or one miscrosecond full-wave period. Accordingly, each square-wave pulse which is one-half period, will be 0.5 microsecond duration in time. The one megacycle pulses per second are connected from the output of pulse generator 11 to a frequency divider 12 which has the capability of dividing the frequency of its input pulses by a factor of ten thousand so that the output of the frequency divider 12 is a series of pulses, one hundred of which occur each second. However, the output pulses are of the same time duration as the input pulses, i.e., 0.5 microsecond, though they occur only one hundred times per second as contrasted to the input to the frequency divider 12 which is one million cycles per second.

The output of the frequency divider 12 is connected to the input of a selectively positionable switch means 13, the function of which will be more fully explained hereinafter. The output of the switch 13 is shown as having one contact connected to a connecting means 17*b*. The output of the frequency divider 12 is also connected to a fixed delay means 14 where a determinable amount of delay is electrically imposed upon the signals whence they are fed to a twenty-four bit clock accumulator 15. The output of the twenty-four bit clock accumulator 15 is, in turn, connected as the input to a write control logic 16 which is interconnected with a variable delay means 28.

The write control logic 16 is in turn connected to a separable connecting means 17*c*. The master signal portion of the embodiment of FIG. 1 also includes a one-shot multivibrator 27, the function of which will be described in detail hereinafter.

The slave portion of the embodiment of FIG. 1 is shown on the right hand side of the schematic diagram and comprises an atomic frequency standard 19 as the source of signals which may be of the same frequency as the atomic frequency standard 10 of the master portion, that is to say, one megacycle. However, it is to be understood that the atomic frequency standard 19 need not be synchronous with the atomic frequency standard 10 though it may be of the same frequency. In a manner similar to the arrangement of the master portion of the embodiment, the slave portion is provided with a pulse generator 20 which receives the output of the atomic frequency standard 19 and generates pulses of substantially square-wave form. The output of pulse generator 20, in the form of such pulses, is fed to a coincidence gate means 21. The output of the coincidence gate means 21 is in turn fed to a frequency divider 24 which, in a manner similar to the frequency divider included in the master portion of the system, divides the frequency of its input pulses by a factor of ten thousand, therefore providing an output of one hundred pulses per second from its one million pulses per second input. The output of the frequency divider 24 is connected to provide the input to a fixed delay means 25 which imposes a selected determinable amount of electrical delay upon the input pulses and then feeds such pulses to a twenty-four bit clock accumulator 26. It will be noted that the twenty-four bit clock accumulator 26 also has an additional input connection which is adapted to receive an input from the master-slave connection 17*c*, comprising twenty-four bits of information in parallel and expressive of the time of day. Another input to the accumulator 26 is received from the separable connection 17*e*, which input is capable of resetting the twenty-four bit clock accumulator 26.

The coincidence gate means 21 requires two coincident inputs in order to be operative to pass the one million pulses per second generated by the pulse generator 20 to its output to be impressed upon the frequency divider 24. This control is afforded by a "set" output of flip-flop 22 and the flip-flop 22 in turn is controlled by a "set" and "reset" input. The "set" input is derived from a variable delay means 23 which is connected between the "set" input of the flip-flop 22 and the separable connection 17*b*. The flip-flop 22 also has a "reset" input which may be received through the separable connection 17*a* as shown in FIG. 1. The "reset" output flip-flop 22 is connected to the frequency divider 24 so that is can reset that frequency divider to begin anew its count of input pulses to be divided by a factor of ten thousand to produce an output of one hundred pulses per second.

The apparatus of FIG. 1 operates in the following manner. The atomic frequency standard 10 generates a one megacycle signal which is converted to a one megacycle square wave pulse by the pulse generator 11. The one megacycle square wave pulses are divided by a factor of ten thousand in the frequency divider 12 to provide a one hundred pulse per second square wave output to the selectively positionable switch means 13. Thus, the master portion of the system includes a first source of signals in the form of the atomic frequency standard 10 and the signals are operated upon by the pulse generator 11 which is simply a pulse forming means and then converted to a subfrequency by the frequency divider 12. In the slave portion of the embodiment of FIG. 1 an atomic frequency standard 19, comparable to the atomic frequency standard 10 of the master portion, provides an asynchronous signal source of the same frequency as that of the atomic frequency standard 10 of the master portion. The one megacycle frequency output of the atomic frequency standard 19 is similarly shaped by pulse generator 20 to provide the square wave input to a coincidence gate 21. However, the input to the coincidence gate 21 will not pass therethrough to the frequency divider 24 unless the coincidence gate 21 is gated on by a "set" signal which is derived from flip-flop 22.

It is a prime object and function of the present invention that the system be so arranged that the subfrequencies derived from the frequency dividers 12 of the master portion of the system, and the frequency divider 24 of the slave portion of the system, respectively, be substantially synchronous within a determinable and acceptable degree of synchronism. Accordingly it is of the utmost importance in the concept and object of the present invention that the coincidence gate 21 be gated at the proper time to insure that the frequency divider 24 will begin to count ten thousand pulses at or very closely to the same time at which the frequency divider 12 will begin to count ten thousand pulses by reason of which the respective frequency dividers 12 and 24 will each produce one hundred pulses per second responsive to such counts.

It will be appreciated by those knowledgeable in the art that if the time of actuation of coincidence gate 21 is carefully and closely controlled, the degree of lack of synchronism of the one hundred pulse per second outputs of the respective frequency dividers 12 and 24 will be similarly controlled within an acceptable and desirable degree. Thus, in accordance with the concept of the present invention, an amount of variable delay is interposed by a variable delay means 23 to put the flip-flop 22 in its "set" condition providing a "set" output as a coincidence input to the coincidence gate 21 at the proper time so that, together with the inherent propagation delays in the system, substantial synchronism is assured as to each ten thousand pulse count by the respective frequency dividers 12 and 24.

In order to insure the proper frequency count in substantial synchronism between the frequency dividers 12 and 24, umbilical cable connectors having a plurality of connections 17*a*, 17*b*, 17*c*, 17*d* and 17*e* are temporarily engaged so as to connect the master portion of the system with the slave portion of the system. A logical "one" level signal is impressed upon the switch means 18, the ganged switch comprising 18 and 13 being set to the "reset" position. This "reset" input operates initially upon the flip-flop 22 so as to put the flip-flop in a "reset" condition providing a "reset" output to the frequency divider 24 thereby clearing that frequency divider to insure that it will begin to count from a first count, sequentially through ten thousand pulse counts when it is actuated. Next, the switch comprising the two portions 18 and 13 is simultaneously positioned in its "set" position. Thus, the logical "one" level signal from switch 18 is removed from the flip-flop 22 and the "set" signal is fed through the variable delay 23 to the flip-flop 22 to cause the flip-flop to be actuated to its "set" signal condition, providing a "set" signal input to the coincidence gate 21 in response to the one hundred pulse per second pulses coming out of the frequency divider 12 through the variable delay 23 and the flip-flop 22. Accordingly, the frequency divider 24 begins to count at the instant it is so actuated, dividing its one million pulse per second input received from the pulse generator 20 by a factor of ten thousand and thereby producing an output having a frequency of one hundred pulses per second substantially in synchronism with the one hundred pulse per second output of frequency divider 12.

In the particular embodiment illustrated in FIG. 1, additional portions of the equipment operate as follows: the one hundred pulse per second output of frequency divider 12 is connected to a fixed delay means 14 where it actuates a twenty-four bit clock accumulator 15, providing an output which is received in a write control logic means 16. The write control logic 16 is connected through the separable connection 17*c* to be impressed upon the twenty-four bit clock accumulator 26 so that it is set at precisely the same time of day as the twenty-four bit clock accumulator 15, thereby insuring absolute synchronism of the master and slave portions of the system with respect to the time of day, as well as substantial synchronism respecting the two one hundred pulse per second signals which the respective portions of the system generate. The write control logic 16 is actuated by the "set" signal from the flip-flop 22 of the slave portion of the system which is received by a one-shot multivibrator 27 to provide a signal delayed by one microsecond through an appropriate delay means 28 to trigger the write control logic 16 into the twenty-four bit clock accumulator 26. Thus, when synchronizing functions as previously described have been accomplished, the separable connector comprising the connections 17*a*, 17*b*, 17*d* and 17*e* is disconnected and the master and the slave portions of the system are then independently operable so that they can be completely separated from one another but remain in substantial synchronism both as to time of day and synchronism of the one hundred pulse per second signals in the manner previously described.

The diagram of FIG. 2 shows in somewhat more detail that portion of the embodiment of FIG. 1 which is particularly concerned with the development of two substantially synchronous signals from two asynchronous signal sources. As shown in FIG. 2, the switch means 18 provides a logical "one" level "reset" signal in its upper position. The "reset" signal derived from the upper position of the switch 18 is fed through connection 17*a* to the "reset" input of the flip-flop 22. The flip-flop 22 accordingly produces a "reset" output signal which is fed to the frequency divider 24 to "reset" that component. When the composite switch means 18 and 13 is set in its second position, it provides no signal through the separable connection 17*a* but provides a "set" signal through separable connection 17*b*, which signal actually comprises a 0.5 microsecond square wave pulse occurring at the rate of one hundred pulses per second as derived from the frequency divider 12 of the master portion of the system. These pulses are connected through the separable connector 17*b* to a driver 29 through the variable delay 23 previously described in connection with FIG. 1, whence they are fed to a buffer means 30 and provides a repetitive "set" input to the previously described flip-flop 22. It will be assumed for purposes of explanation that the coincidence gate means 21 requires not less than 0.3 microsecond duration of coincident pulsing in order to become operative to feed the one million pulse per second signals from the pulse generator 20 to the frequency divider 24 of the slave portion of the system.

Figure 3:
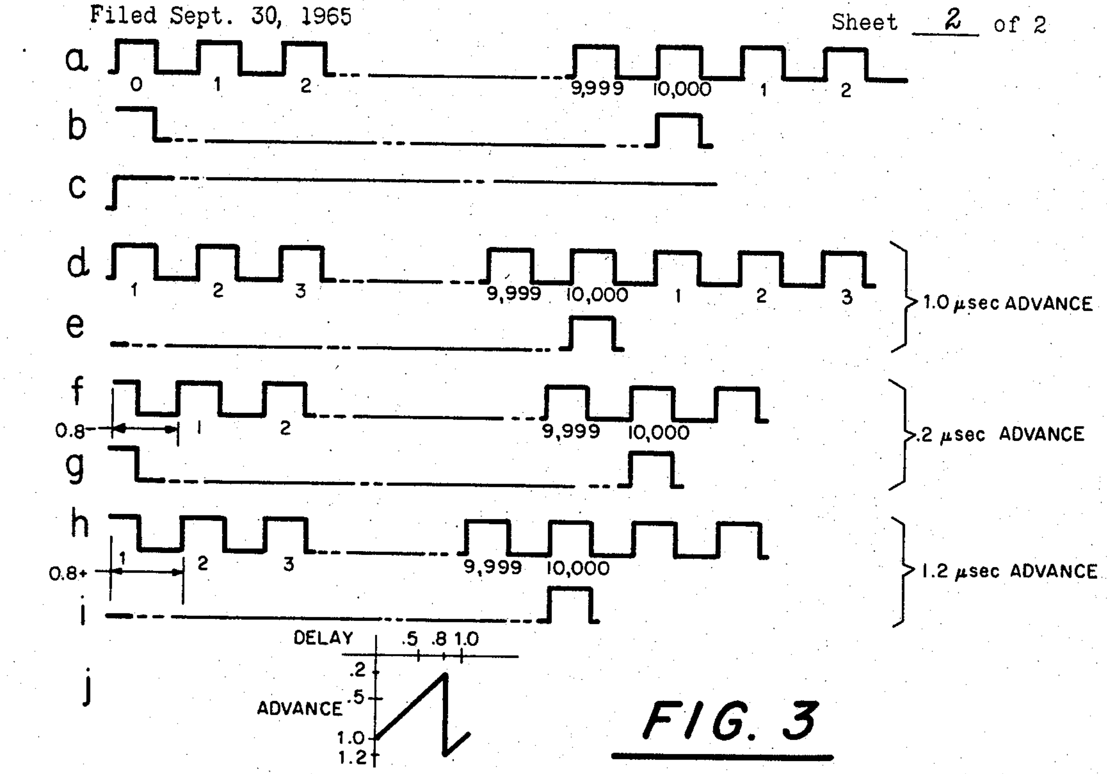
FIG. 3 and FIG. 4 are illustrative of the types of waveforms that may be typically employed and generated in equipment embodying the present invention.

As illustrated in FIG. 3, the waveform 3*a* shows one megacycle frequency pulses numbering from 0 through 10,000 and, as will be noted in the waveform 3*b* immediately below that of 3*a*, the one hundred pulse per second outputs of the frequency divider of the master portion of the system occur every ten thousand pulses of the higher frequency pulse source, at the 0 pulse and at the 10,000th pulse.

If it were to be assumed for purposes of illustration and explanation, that there were no propagation delay between the actuation of the coincidence gate in the slave portion of the system and the occurrence of the one hundred pulse per second pulses of the master portion of the system, the gate would be gated to an "on" condition as shown by waveforms 3*c* of FIG. 3. Accordingly, assuming further that the two higher frequency sources of the master and the slave portions of the system are in exact synchronism, the high frequency pulses will begin being counted by the frequency divider of the slave portion of the system as shown in waveform 3*d*, where it is to be noted that the count as between the frequency divider of the master portion and the frequency divider of the slave portion of the system is out of phase one full microsecond, or stated another way, out of phase by one full cycle of a one megacycle frequency. As a result of the outputs of the respective frequency dividers are one full microsecond out of phase as may be seen by a comparison of waveforms 3*b* and 3*c*.

However, if it be assumed that the phase of the one megacycle frequency source in the slave portion of the system is out of phase by reason of leading the phase of the comparable frequency source of the master portion of the system by approximately two-tenths of a microsecond (which may be said in an equivalent way to be lagging the frequency source of the master portion of the system by approximately eight-tenths of a microsecond) the resultant one hundred pulse per second pulses developed by the slave portion of the system will be either two-tenths of a microsecond or one and two-tenths of a microsecond advanced with respect to the one hundred pulse per second pulses developed by the master portion of the system, dependent on whether the high frequency source of the above portion is lagging the high frequency source of the master portion by slightly less or slightly more than eight-tenths of a microsecond, respectively.

As shown further in waveform 3*f*, if the amount of phase difference between the primary frequency source of the master with respect to the primary frequency source of the slave is such that the slave frequency is slightly less than eight-tenths microseconds lagging the master portion of the system, slightly less than three microseconds of the first pulse will be coincident with the actuation of the gate as shown by waveform 3*c*. Accordingly, the first partial pulse will not be counted by the frequency divider because the coincidence gate of the system requires not less than three microseconds of coincident signals to be actuated. Therefore, the next full pulse, as indicated by the numeral "1" in waveform 3*f*, is the first pulse to be counted by the frequency divider of the slave portion of the system. As a consequence the output of the slave frequency divider shown by waveform 3*g* is 0.2 microsecond advanced relative to the output of the master frequency divider as shown by waveform 3*b*.

On the other hand, if the slave portion of the system has a prime frequency source which is somewhat more than eight-tenths microseconds lagging the frequency source of the master portion of the system, as is shown in waveform 3H of FIG. 3, the first portion of a pulse which is coincident with the actuation of the gate as shown by waveform 3*c* will actuate the coincidence gate of the slave portion of the system since it is slightly more than three microseconds in duration. Therefore, that partial pulse is counted by the frequency divider of the slave portion of the system as indicated by the numeral 1 of the partial pulse on the left-hand portion of waveform 3*h* illustrated in FIG. 3 and the resultant output of the slave frequency divider as shown by waveform 3*i* is 1.2 microseconds advanced relative to the master frequency divider output of waveform 3*b*. This operation may be expressed as a characteristic of the type shown by FIG. 3*j* which shows the difference in phase between the primary one megacycle master frequency with respect to the one megacycle slave frequency plotted on the abscissa, and the difference in phase of the one hundred cycle slave pulses with respect to the one hundred pulse per second master pulses plotted as the ordinate in terms of advance and delay, all indicated in terms of microseconds.

In accordance with the assumed operation demonstrated by the several waveforms of FIG. 3, resultant characteristics are developed as illustrated by FIG. 3, indicating the mean phase synchronous error will be $$\frac{-1.2\ \mu\text{ sec.}+(-0.2)\ \mu\text{ sec.}}{2}=-0.7\ \mu\text{ sec.}$$

Accordingly, it will be seen that for the particular equipment, frequencies, and operative parameters assumed, a selectively adjusted total system delay of seven-tenths microseconds will make the mean phase synchronism error equal to zero and in any case never greater than five-tenths microseconds.

As indicated in FIG. 2, the interconnected elements arranged to operate in a manner previously described, each represents an amount of delay or propagation time inherent in its operation which might be termed its individual response time. Such delays are indicated individually in FIG. 2 in terms of microseconds and as may be seen the aggregate or cumulative delay, including a selectively variable delay 23, is adjusted to equal 0.7 microsecond which might be termed the selected total system progagation time from the one hundred pulse per second output of the frequency divider 12 of the master portion of the system to the input of the frequency divider 24 of the slave portion of the system, the two frequency dividers it is desired to have produce substantially synchronous outputs.

Figure 4:
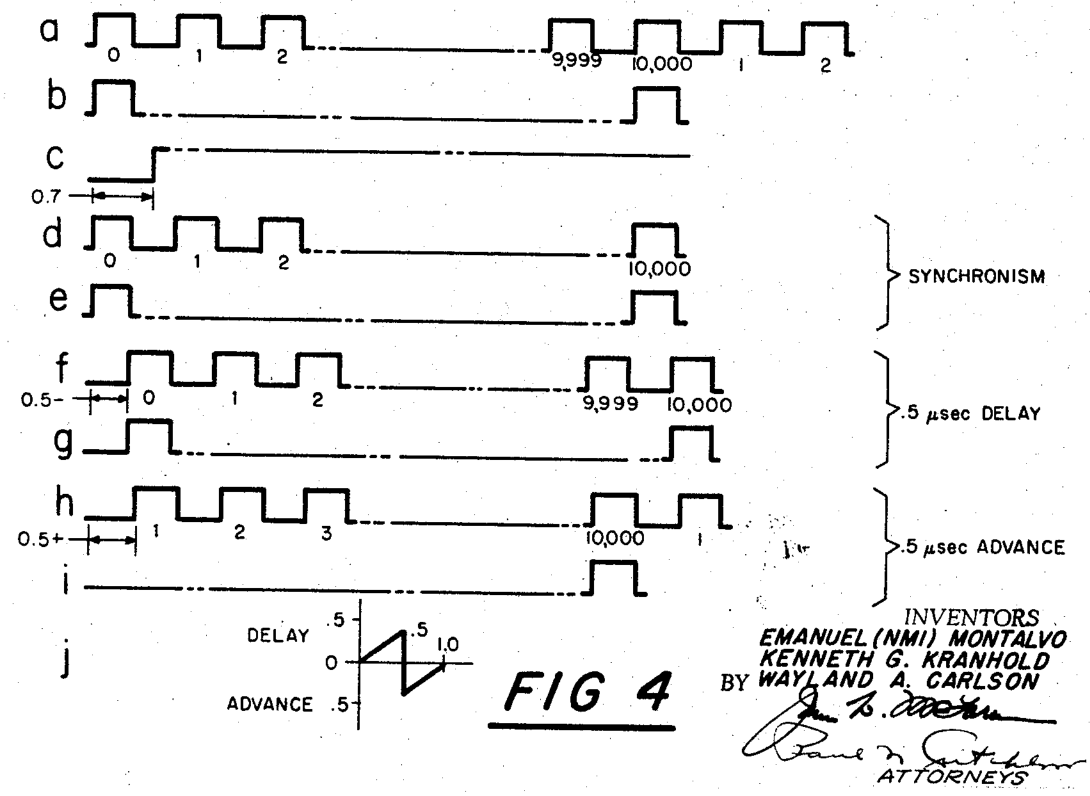

The typical cumulative propagation delays illustrated in FIG. 2 may be used as the basis for explaining operation of the present invention in terms of the embodiment illustrated in FIGS. 1 and 2. Typical waveforms generated in such operation and their phase relationships are illustrated in FIG. 4. In explaining the operation of the present system in terms of waveforms and relative phase relationships, it will be assumed that the propagation delay between the generation of the one hundred pulse per second output of the master portion of the system and the generation of the one hundred pulse per second output of the slave portion of the system will include a selectively adjusted 0.7 microsecond propagation time delay which may be termed the time necessary to cause a triggering pulse from the master frequency divider 12 to reach the slave frequency divider 24. This can be demonstrated by reference to the waveforms of FIG. 4.

In FIG. 4 the waveform *4a* illustrates the one megacycle source of the master portion of the system which produces one million pulses per second as indicated from 0 starting at the left-hand in the waveform *4a*. The one hundred pulse per second pulses are illustrated by waveform *4b* to be coincident with each ten thousand pulse count of the one megacycle pulse source of waveform *4a*. As previously mentioned, it is desirable that the gate be operated at a 0.7 microsecond delay with respect to the propagation of the one hundred pulse per second pulses of the master portion of the system; as illustrated by waveform *4c* it is further to be assumed that such gate is responsive to not less than three microseconds duration of coincident signals.

If the primary frequency sources of the master and slave portions of the system are in exact synchronism initially, as illustrated by the master frequency source waveform *4a* and the slave frequency wave source *4d*, the one hundred pulse per second signals generated in response thereto will be in exact synchronism as illustrated in the waveforms *4b* and *4e*. However, if the signals of the primary signal source of the slave portion of the system are delayed by slightly less than five-tenths microseconds as illustrated by the waveform *4f*, the resultant one hundred pulse per second signal generated by the slave portion of the system as illustrated by waveform *4g* will be five-tenths microseconds delayed with respect to the comparable one hundred pulse per second signal as generated by the master portion of the system as illustrated by waveform 46. Similarly, if the primary frequency source of the slave portion of the system as illustrated by waveform *4h* is slightly more than five-tenths microseconds delayed with respect to the primary frequency source of the master portion of the system, the waveforms of one hundred pulses per second developed by the slave portion of the system will be five-tenths microseconds advanced as illustrated by waveform *4h* with respect to the comparable one hundred pulse per second signals developed by the master portion of the system as illustrated by waveform *4i*.

It will be appreciated by those skilled in the art, that the waveforms generated by the respective primary frequency sources of the master and slave portions of this system can never be more than five-tenths microseconds out of phase with respect to advance or delay when derived from one megacycle frequency sources. This is because when one signal becomes more than five-tenths microseconds delayed with respect to the other, it can be said to be something less than five-tenths microseconds advanced relative to the same waveform. Accordingly, a characteristic of operation is produced by the type illustrated by FIG. *4j* wherein the respective abscissa and ordinate indicia are the same as those of FIG. *3j*, it will be seen that the mean phase synchronous error will be $$\frac{+0.5+(-0.5)}{2}=0$$

which is consistent with the calculated prediction made in accordance with the assumed conditions and results of the waveforms illustrated in FIG. 3.

It should be noted carefully that in connection with the concept of the present invention, the waveforms generated at the rate of one hundred pulses per second can never be more than five-tenths microseconds out of synchronism, which relative to the frequency of such pulses is substantial synchronism in accordance with the concept and the teaching of the present invention.

Moreover, the concept of the present invention contemplates that if a higher degree of synchronous accuracy is desired, a higher frequency primary source of signals may be employed with the result that the degree of lack of synchronism will be inversely proportional to the ratio of the primary signal source to the sub-frequency.

That is to say, that if a five megacycle frequency source were employed to develop one hundred pulses per second, the maximum lack of synchronism would be one-tenth microsecond; similarly, if a ten megacycle primary frequency source were employed in the system, the maximum lack of synchronism in the one hundred pulse per second pulses derived therefrom would be five-hundredths of one microsecond.

This is a most important aspect of the present invention because it affords any desired degree of synchronism within the operative limitations of the other elements of the system and design parameters such as frequency response characteristics, etc.

The master and the slave portions of a system embodying the concept of the present invention may be brought together by temporary interconnection so that the time of day is synchronized by means of an appropriate clock arrangement, for instance, under control of an appropriate write control logic impressed upon the slave from the master portion of the system; at the same time the subfrequencies are brought into substantial synchronism as described in detail in connection with the description of the embodiments of the present invention, and then the master and slave portions of the system may be separated and will continue to operate in substantial synchronism within known and acceptable bounds of deviation for considerable lengths of time.

It should be noted that in accordance with the disclosed inventive concept, the time of propagation delay (approximately seven-tenths of one microsecond) including the variable delay introduced into the system, and the operative response time of the coincidence gate (approximately three-tenths of one microsecond) totals approximately one microsccond which is substantially equal to one periodic full-cycle of the waveforms from which the substantially synchronous frequencies are derived.

Further, it is to be understood that in connection with the present invention a variable delay is shown as being introduced into the propagation path of the signal so that an appropriate delay may be imposed upon the signal in accordance with the other parameters of the system. Thus, the present invention can be made to accommodate variations in the constants of delay and other parameters to be found in comparable systems.

Obviously many modifications and variations of the present invention are possible in the light of the above teachings. It is therefore to be understood that within the scope of the appended claims the invention may be practiced otherwise than as specifically described.

What is claimed is:

1. A system for generating substantially synchronous signals from discrete first and second asynchronous signal sources of substantially the same frequency comprising:

a first frequency divider connected for dividing the frequency of said first asynchronous signal source to a first subfrequency;

a second frequency divider adapted to divide said second asynchronous frequency to a second subfrequency equal to said first subfrequency;

a coincidence gate operative to produce an output in response to a determinable minimum coincident duration of two input signals substantially equal to one periodic full cycle of said asynchronous sources, said coincidence gate being connected to receive one input from said second asynchronous signal source and having its output connected to said frequency divider; and means connectable between said first frequency divider output and said coincidence gate and including electrical delay means connected in circuit with said first frequency divider signal, said electrical delay means being of a value which, when summed with the inherent electrical delay of the system, will cause coincidence of said first frequency divider signal with said second asynchronous signal for at least said determinable minimum duration to render said coincidence gate operative.

2. A system as claimed in claim 1 wherein said first and second asynchronous signals are substantially square wave pulses.

3. A system as claimed in claim 1 wherein said first asynchronous signal source and its associated means for generating a first subfrequency is separable from said second asynchronous signal source and its associated means for generating a second subfrequency for independent substantially synchronous operation.

4. A system as claimed in claim 1 wherein said coincidence gate is controlled by an input from an electrically bi-stable device.

5. A system as claimed in claim 1 wherein said electrical delay means is selectively variable.

6. A system for substantially synchronizing two separable signals of the same frequency derived from separated first and second asynchronous sources, comprising:

a first frequency divider connected for dividing the frequency of said first asynchronous signal to a first subfrequency;

a second frequency divider adapted to divide said second asynchronous frequency to a second subfrequency equal to said first subfrequency;

a coincidence gate operative to produce an output in response to a determinable minimum coincident duration of two input signals, said coincidence gate being connected to receive one of its inputs from said second asynchronous signal source and having its output connected to said second frequency divider;

a bi-stable device having "set" and "reset" outputs controllable by "set" and "reset" inputs, said "set" output being connected for providing the other of said two inputs to said coincidence gate, and said "reset" output being connected to provide a clearing signal to said second frequency divider;

a variable electrical delay means having its output connected to the "set" input of said bi-stable device;

means for connecting said first frequency divider output to the input of said variable electrical delay device; and a source of "reset" signal connectable to the "reset" input of said bi-stable device.

7. A system as claimed in claim 6 wherein said means for connecting said first frequency divider output to the input of said electrical delay device includes mean for connecting said source of "reset" signal to the "reset" input of said bi-stable device.

8. A system as claimed in claim 6 wherein said means for connecting is adapted to be separable from said input connections.

9. A system as claimed in claim 7 wherein said means for connecting includes a switch means adapted to sequentially connect said "reset" and "set" signal sources.

10. A system as claimed in claim 6 and including first and second clock means receive each respective frequency divider output.

11. A system as claimed in claim 9 and including control logic means responsive to the output said first clock means and adapted to be separably connected to set said second clock means through said means for connecting said first frequency divider output to the input of said variable electrical delay device.

References Cited

UNITED STATES PATENTS

| | | | |
|---|---|---|---|
| 2,490,500 | 12/1949 | Young | 328—155 |
| 2,923,820 | 2/1960 | Liguori | 328—155 |
| 2,980,858 | 4/1961 | Grondin | 328—63 |
| 2,986,699 | 5/1961 | McHenry | 328—110 |
| 3,270,288 | 8/1966 | Hackett | 328—63 |

ARTHUR GAUSS, *Primary Examiner.*

HAROLD DIXON, *Assistant Examiner.*

U.S. Cl. X.R.

328—110, 133